(12) United States Patent
Goldberg

(10) Patent No.: US 10,710,602 B2
(45) Date of Patent: Jul. 14, 2020

(54) SYSTEMS AND METHODS FOR A VEHICLE CONTROLLER SAFETY MONITOR

(71) Applicant: UATC, LLC, San Francisco, CA (US)

(72) Inventor: Joshua David Goldberg, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 299 days.

(21) Appl. No.: 15/810,495

(22) Filed: Nov. 13, 2017

(65) Prior Publication Data

US 2019/0106117 A1 Apr. 11, 2019

Related U.S. Application Data

(60) Provisional application No. 62/569,054, filed on Oct. 6, 2017.

(51) Int. Cl.
| | | |
|---|---|---|
| *B60W 50/04* | (2006.01) | |
| *B60W 30/00* | (2006.01) | |
| *G05D 1/02* | (2020.01) | |
| *G05D 1/00* | (2006.01) | |
| *G06F 11/00* | (2006.01) | |

(52) U.S. Cl.
CPC ............ *B60W 50/04* (2013.01); *B60W 30/00* (2013.01); *G05D 1/0055* (2013.01); *G05D 1/0088* (2013.01); *G05D 1/0214* (2013.01); *G06F 11/00* (2013.01); *G05D 2201/0213* (2013.01)

(58) Field of Classification Search
CPC .... B60W 50/04; B60W 30/00; G05D 1/0055; G05D 1/0088; G05D 1/0214; G05D 2201/0213; G06F 11/00
USPC ............................................................ 701/23
See application file for complete search history.

(56) References Cited

U.S. PATENT DOCUMENTS

| | | | | |
|---|---|---|---|---|
| 10,326,793 | B2* | 6/2019 | Wesie | H04B 1/3822 |
| 2014/0244096 | A1* | 8/2014 | An | G05D 1/0055 |
| | | | | 701/25 |
| 2014/0335823 | A1* | 11/2014 | Heredia | H04L 51/38 |
| | | | | 455/411 |
| 2015/0158499 | A1* | 6/2015 | Koravadi | B60T 7/12 |
| | | | | 701/23 |
| 2016/0036814 | A1* | 2/2016 | Conrad | H04W 12/0023 |
| | | | | 713/171 |
| 2016/0167653 | A1* | 6/2016 | Malone | B60W 10/18 |
| | | | | 701/23 |
| 2017/0139411 | A1* | 5/2017 | Hartung | G05D 1/0077 |
| 2017/0228279 | A1* | 8/2017 | Mariani | G06F 11/008 |
| 2018/0009446 | A1* | 1/2018 | Ricci | G06Q 20/108 |
| 2018/0061212 | A1* | 3/2018 | Dayalan | G08B 25/14 |

(Continued)

*Primary Examiner* — Tuan C To
(74) *Attorney, Agent, or Firm* — Dority & Manning, P.A.

(57) ABSTRACT

Systems and methods are directed to monitoring the status of a vehicle controller or other autonomy system during operation of an autonomous vehicle. In one example, a system includes one or more processors; and memory storing instructions that, when executed by the one or more processors, cause the one or more processors to perform operations. The operations include obtaining a message from a vehicle controller. The operations further include, based at least partly on the message, determining whether a failure mode exists. The operations further include providing, in response to determining the failure mode exists, one or more commands to implement a safety measure response for the autonomous vehicle.

17 Claims, 7 Drawing Sheets

(56) References Cited

U.S. PATENT DOCUMENTS

| | | | | |
|---|---|---|---|---|
| 2018/0103036 A1* | 4/2018 | Fox | ............... | F42B 12/46 |
| 2018/0241199 A1* | 8/2018 | Morgan | ............... | H02H 7/261 |
| 2018/0349259 A1* | 12/2018 | Mariani | ............... | G06F 11/008 |
| 2019/0004854 A1* | 1/2019 | Yang | ............... | G06F 9/4831 |
| 2019/0066399 A1* | 2/2019 | Jiang | ............... | G07C 5/006 |

* cited by examiner

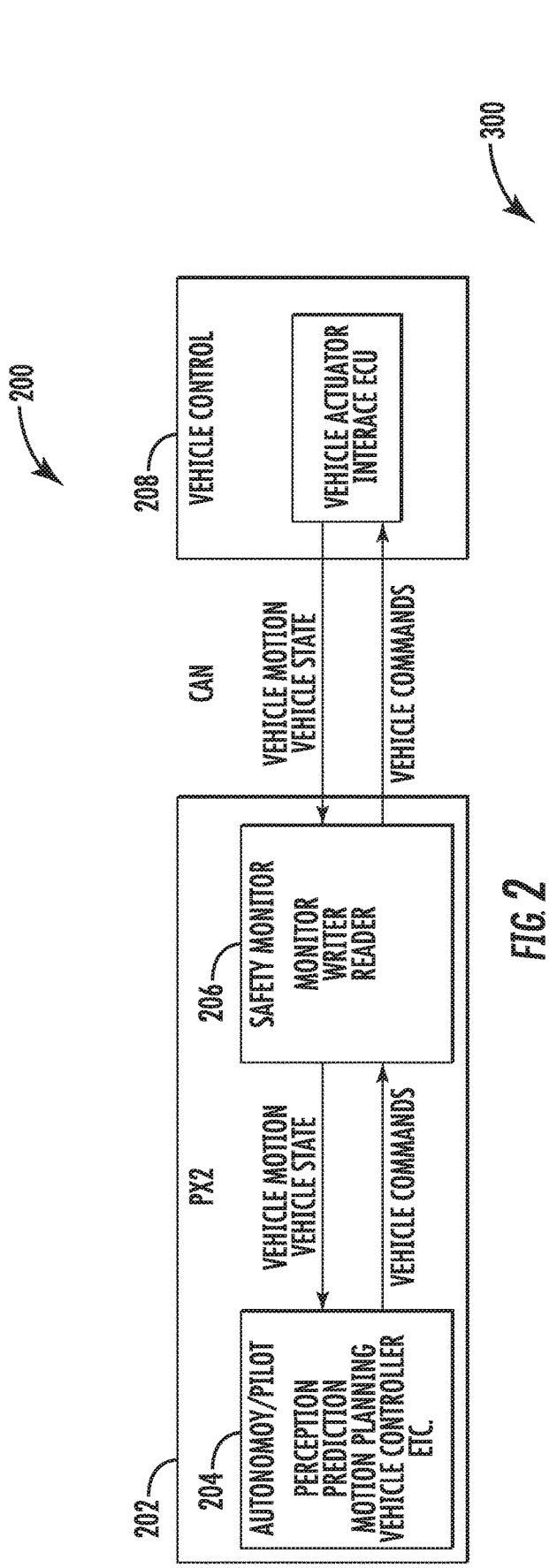
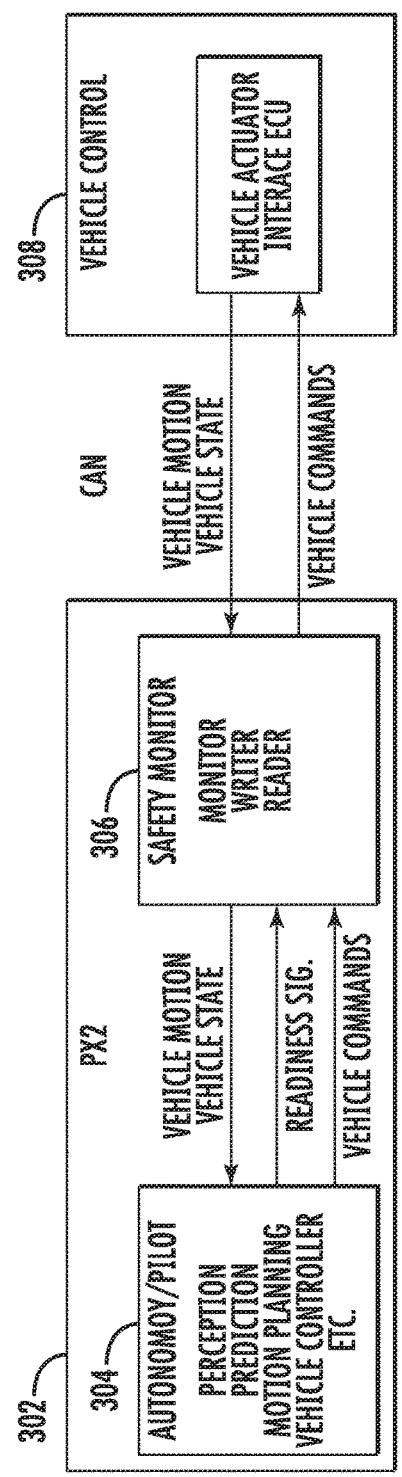
FIG. 2
FIG. 3

SYSTEMS AND METHODS FOR A VEHICLE CONTROLLER SAFETY MONITOR

This application claims the benefit of U.S. Provisional Application No. 62/569,054, filed Oct. 6, 2017, which is incorporated herein by reference.

FIELD

The present disclosure relates generally to autonomous vehicles.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether. Due to the lack of human intervention in the operation of an autonomous vehicle, monitoring the status of the autonomous vehicle systems, such as a vehicle controller, can be important to the ongoing operation of the autonomous vehicle.

SUMMARY

Aspects and advantages of embodiments of the present disclosure will be set forth in part in the following description, or can be learned from the description, or can be learned through practice of the embodiments.

One example aspect of the present disclosure is directed to a system. The system includes one or more processors; and memory storing instructions that, when executed by the one or more processors, cause the one or more processors to perform operations. The operations include obtaining a message from a vehicle controller. The operations further include, based at least partly on the message, determining whether a failure mode exists. The operations further include providing, in response to determining the failure mode exists, one or more commands to implement a safety measure response for the autonomous vehicle.

Another example aspect of the present disclosure is directed to a computer-implemented method for providing a safety monitor. The method includes obtaining, by a computing system comprising one or more computing devices, a message from a vehicle controller. The method further includes determining, by the computing system, whether a failure mode exists. The method further includes providing, by the computing system in response to determining the failure mode exists, one or more commands to implement a safety measure response for the autonomous vehicle.

Another example aspect of the present disclosure is directed to an autonomous vehicle. The autonomous vehicle includes a vehicle computing system, the vehicle computing system including one or more processors; and memory storing instructions that, when executed by the one or more processors, cause the one or more processors to perform operations. The operations include obtaining a message from a vehicle controller. The operations further include determining whether a failure mode exists. The operations further include providing, in response to determining the failure mode exists, one or more commands to implement a safety measure response for the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of a first example vehicle controller and safety monitor system according to example embodiments of the present disclosure;

FIG. 3 depicts a block diagram of a second example vehicle controller and safety monitor system according to example embodiments of the present disclosure;

DETAILED DESCRIPTION

Figure 1:
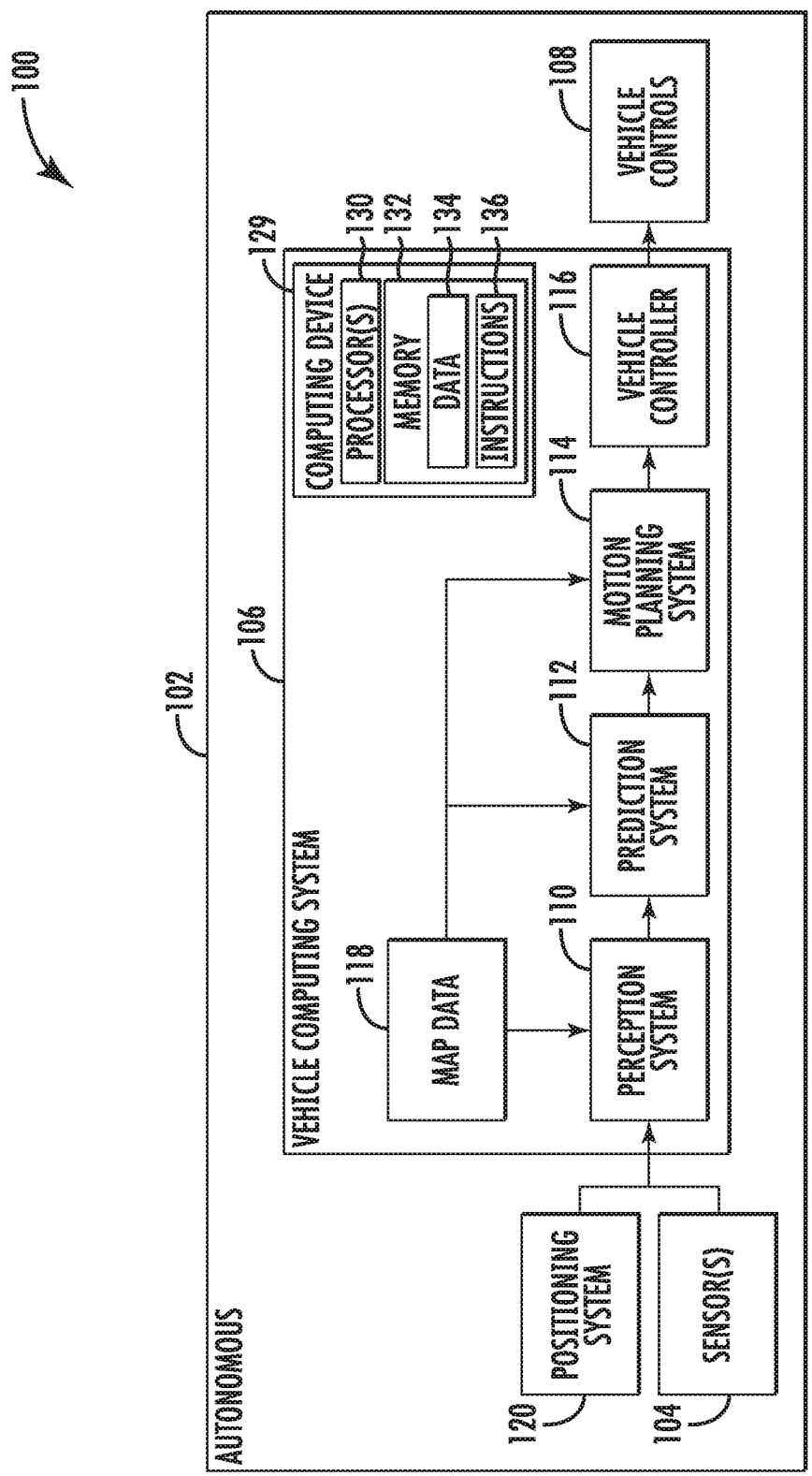
FIG. 1 depicts a block diagram of an example system for controlling the navigation of a vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to monitoring the status of a vehicle controller during operation of an autonomous vehicle. In particular, the systems and methods of the present disclosure can monitor the outputs of an autonomous vehicle controller and/or other autonomy subsystems. The systems and methods of the present disclosure can detect one or more error and/or failure modes for the vehicle controller and/or other subsystems, such as a controller failure and/or the like. The systems and methods of the present disclosure can then initiate one or more appropriate responses and/or maneuvers, such as a safe stop or the like.

In particular, a vehicle controller can generate signals to provide for autonomous operation of a vehicle. Example aspects of the present disclosure can provide for a safety monitor system that resides between the autonomous vehicle controller and the one or more vehicle interfaces (e.g., vehicle control interfaces for steering, acceleration, braking, and/or the like). The safety monitor system can monitor whether signals are being received from the vehicle controller and determine whether there is a potential failure or error mode that may impact autonomous vehicle operation. For example, the safety monitor system can determine the amount of time that has passed since a signal from the vehicle controller has been updated. If the amount of time is greater than a threshold amount of time, the safety monitor system can determine that a failure has occurred and can generate one or more signals to provide for an appropriate response. For example, the safety monitor system can generate one or more commands to execute a safe stop of the vehicle, alert a driver to the failure, and/or disengage the autonomous operation of the vehicle.

More particularly, an autonomous vehicle (e.g., a ground-based vehicle, air-based vehicle, other vehicle type, etc.) can include a variety of systems onboard the autonomous vehicle to control the operation of the vehicle. For instance, the autonomous vehicle can include one or more data acquisition systems (e.g., sensors, image capture devices), one or more vehicle computing systems (e.g. for providing autonomous operation), one or more vehicle control systems, (e.g., for controlling acceleration, braking, steering, etc.), and/or the like. The data acquisition system(s) can acquire sensor data (e.g., LIDAR data, radar data, image data, etc.) associated with one or more objects (e.g., pedestrians, vehicles, etc.) that are proximate to the autonomous vehicle and/or sensor data associated with the vehicle path (e.g., path shape, boundaries, markings, etc.). The sensor data can include information that describes the location (e.g., in three-dimensional space relative to the autonomous vehicle) of points that correspond to objects within the surrounding environment of the autonomous vehicle (e.g., at one or more times). The data acquisition system(s) can provide such sensor data to the vehicle computing system.

In addition to the sensor data, the vehicle computing system can obtain map data that provides other detailed information about the surrounding environment of the autonomous vehicle. For example, the map data can provide information regarding: the identity and location of various roadways, road segments, buildings, or other items; the location and direction of traffic lanes (e.g. the boundaries, location, direction, etc. of a travel lane, parking lane, a turning lane, a bicycle lane, and/or other lanes within a particular travel way); traffic control data (e.g., the location and instructions of signage, traffic signals, and/or other traffic control devices); and/or any other map data that provides information that can assist the autonomous vehicle in comprehending and perceiving its surrounding environment and its relationship thereto.

The vehicle computing system can include one or more computing devices and include various subsystems that can cooperate to perceive the surrounding environment of the autonomous vehicle and determine a motion plan for controlling the motion of the autonomous vehicle. For instance, the vehicle computing system can include a perception system, a prediction system, and a motion planning system. The vehicle computing system can receive and process the sensor data to generate an appropriate motion plan through the vehicle's surrounding environment.

The perception system can detect one or more objects that are proximate to the autonomous vehicle based on the sensor data. In particular, in some implementations, the perception system can determine, for each object, state data that describes a current state of such object. As examples, the state data for each object can describe an estimate of the object's: current location (also referred to as position); current speed/velocity; current acceleration; current heading; current orientation; size/footprint; class (e.g., vehicle class versus pedestrian class versus bicycle class, etc.); and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object provided by the prediction system and/or the state data for the object provided by the perception system. Stated differently, given information about the classification and current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the classifications, current locations, and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller. The vehicle controller can generate one or more commands, based at least in part on the motion plan, which can be provided to one or more vehicle control interfaces. The one or more commands from the vehicle controller can provide for operating one or more vehicle controls (e.g., actuators or other devices that control acceleration, throttle, steering, braking, etc.) to execute the selected motion plan.

In some implementations, example systems and methods of the present disclosure can provide for a safety monitor system that can monitor the output of the vehicle controller and/or another autonomy subsystem (e.g., sensors, prediction, perception, motion planning, and/or the like) and determine whether a failure or error condition has occurred. According to example aspects of the present disclosure, in some implementations, the safety monitor system can maintain a history of previous signals or command messages received from the vehicle controller. The safety monitor system can generate a timestamp for each message as it is received. The safety monitor system can determine the amount of time that has passed since the last message was received on each successive cycle (e.g., current time minus timestamp of last message). Alternatively, the safety monitor can use a timer to measure the time from the last message. The safety monitor system can determine if the amount of time that has passed has reached or passed a threshold amount of time, and in response, determine that an error or failure has occurred. Upon determining that a failure or error has occurred in the vehicle controller and/or another subsystem, the safety monitor system can generate one or more commands or signals to initiate a safety response. For example, the safety monitor can generate one or more commands to execute a safe stop of the vehicle, alert a driver to the error/failure, and/or disengage the autonomous operation of the vehicle. In some implementations, the safety monitor system can determine whether autonomous operation of the vehicle can be engaged (or should be disengaged if already engaged) based on determining status of the vehicle controller such as whether an error or failure condition exists or not (e.g., whether signals are being received for the vehicle controller and/or another subsystem).

In some implementations, the safety monitor system can perform the vehicle controller status determination on a periodic rate. For instance, instead of waiting for a message to be received, in some implementations, the safety monitor system can determine that a failure has occurred if no message is received from the vehicle controller.

According to an aspect of the present disclosure, in some implementations, the safety monitor system can also monitor whether an autonomous vehicle is ready to engage autonomous operation. For example, the safety monitor system can receive a signal indicating whether the vehicle is ready to engage autonomous operation in addition to monitoring the status of the vehicle controller (and/or other subsystems). The safety monitor system can determine that the vehicle controller is providing signals or command messages and that the vehicle is ready to engage before allowing a driver to engage the autonomous operation. In some implementations, the safety monitor system can provide for different audio alerts corresponding to the decisions being made by the system to be produced for the driver and/or occupants of the vehicle. For example, the safety monitor system can provide for different audio alerts to be played when both the vehicle and controller are in the ready state, for a successful engage, for an unsuccessful engage, for a successful disengage, and/or the like. In some implementations, the safety monitor system can also provide for one or more visualizations, such as on a device screen, to indicate the current status and/or decision state.

According to an aspect of the present disclosure, in some implementations, the vehicle controller, the safety monitor system, and the interfaces to the vehicle (e.g., Controller Area Network (CAN) interfaces) are implemented separately to provide for reliability, such that an error mode in the controller is unlikely to cause the safety monitor system to fail for the same reason. For example, the vehicle controller performs complex operations, where the safety monitor system is less complex. In some implementations, the safety monitor system can be implemented as a state machine having multiple states and transitions from each state to a different state, for example, based on a determination that the time elapsed since a last vehicle control message was received has reached a threshold.

According to example aspects of the present disclosure, in some implementations, the vehicle controller and the safety monitor system can be implemented as separate threads on a processor. In some implementations, when implemented on the same processor, one or more cores of the processor can be isolated for the safety monitor system, for example, to maintain the integrity and robustness of the safety monitor system. For example, in some implementations, one core of a multiple core processor can be isolated for the safety monitor system and the remaining cores of the processor can be used for the other subsystems, such that the safety monitor system does not need to compete with the other subsystems for resources. As such, the safety monitor system can execute on the isolated core without being interrupted for the execution of other processes.

According to another aspect of the present disclosure, in some implementations, the safety monitor system can be implemented using separate hardware (e.g., separate processer(s), etc.) from the vehicle controller (and/or other subsystems) to provide an additional level of robustness. In such implementations, this would provide for the safety monitor system to have its own independent resources and reduce the likelihood that the safety monitor system would fail along with the vehicle controller.

According to another aspect of the present disclosure, in some implementations, the safety monitor system can provide for nominal trajectories that can be executed if the vehicle controller fails. For example, after determining that commands are not being received from the vehicle controller, the safety monitor system could provide for a nominal trajectory to be sent to the vehicle that the vehicle can follow, such as to slowly brake or abruptly brake depending on the context, and alert the driver to regain control.

According to another aspect of the present disclosure, in some implementations, one or more autonomy subsystems can be monitored in addition to the vehicle controller. The safety monitor system can provide different response to the error modes/failure states depending on the subsystem affected. For example, each of the subsystems, such as sensors, perception, prediction, motion planning, and/or the like can have their own error modes/failure states. The safety monitor system can monitor the other subsystems in addition to monitoring the vehicle controller. In some implementations, each subsystem can have its own monitoring metrics which can be understood by the safety monitor system. Each subsystem can monitor for its own failure modes (e.g., edge cases) and report its failure mode to the safety monitor system in a common format. The safety monitor system can aggregate the messages for the different subsystems and provide for different safety responses based on the current failure mode. As an example, one or more sensors, such as a camera may fail or the link from a camera to the system may fail, but the other subsystems (e.g., vehicle localization, motion planning, etc.) and the vehicle controller are still operating properly. The safety monitor system could provide for a response where the vehicle is controlled to stay within the known lanes relative to the last camera cycle, such that a new trajectory is generated that follows the lane but comes to a safe stop before the farthest distance away that the lane is known to be. As another example, if the motion planning system fails, but the vehicle controller is still operating properly, the safety monitor system could provide for a predetermined trajectory to be executed to bring the vehicle to a safe stop. Accordingly, the safety monitor system could provide for the appropriate response to be executed based on which subsystems are reporting errors.

According to an aspect of the present disclosure, in some implementations, the safety monitor system can provide test input data to the controller or any other components of the AV software that the safety monitor has determined to have failed. For example, the safety monitor can include predetermined data that the safety monitor can use as input to the vehicle controller to produce a known output from the vehicle controller when it is functioning correctly. Accordingly, the safety monitor can probe the component to determine a failure mode or to confirm failure of the component. Furthermore, the safety monitor can try a repair action (for resetting and reloading certain software libraries) and then use its test inputs to determine if the component is functioning within specifications. If the component passes the test, the AV may be permitted to continue its normal operation.

According to another aspect of the present disclosure, in some implementations, the audio alerts can be initiated by the safety monitor system in such a way as to not impair successive detection cycles. For example, in some cases, due to the length of an audio sound file, triggering execution of the audio alert could delay further execution of the code, which could delay detection of an error condition and the subsequent response. Accordingly, in some implementations, the audio alert is created in a separate execution thread so that the audio alert can be triggered and played in the background, allowing the system to continue executing the safety checks at the same nominal rate.

In some implementations, the safety monitor system can provide for visual alerts to the driver. For example, visual indicators, such as a bane of LEDs can be provided in an autonomous vehicle. The safety monitor system can provide for different patterns or lights to be triggered in the LED array based on the current decision state, for example, in addition to providing audio alerts.

The systems and methods described herein provide a number of technical effects and benefits. For instance, the vehicle computing system can locally (e.g., on board the autonomous vehicle) detect and identify a failure or error in an autonomous vehicle controller and/or other autonomy subsystems and provide for an appropriate response to the failure condition. For example, by monitoring the vehicle controller and/or other autonomy subsystems, the systems and methods of the present disclosure can provide for more accurate and timely error detection. As such, the vehicle computing system can proactively adjust the operation of the autonomous vehicle to achieve improved driving safety.

With reference to the figures, example embodiments of the present disclosure will be discussed in further detail.

FIG. 1 depicts a block diagram of an example system 100 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further include a positioning system 120. The positioning system 120 can determine a current position of the autonomous vehicle 102. The positioning system 120 can be any device or circuitry for analyzing the position of the autonomous vehicle 102. For example, the positioning system 120 can determine position by using one or more of inertial sensors, a satellite positioning system, based on IP address, by using triangulation and/or proximity to network access points or other network components (e.g., cellular towers, WiFi access points, etc.) and/or other suitable techniques for determining position. The position of the autonomous vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well. Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116. The vehicle controller 116 can generate one or more commands, based at least in part on the motion plan, which can be provided to one or more vehicle interfaces. The one or more commands from the vehicle controller 116 can provide for operating one or more vehicle controls 108 (e.g., actuators or other devices that control acceleration, throttle, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

FIG. 2 depicts a block diagram of a first example vehicle controller and safety monitor system 200 according to example embodiments of the present disclosure. As illustrated in FIG. 2, a computing system, such as vehicle computing system 202, can include an autonomy system 204 (for example, as described in regard to the vehicle computing system 106 of FIG. 1) and a safety monitor system 206.

In some implementations, the safety monitor system 206 can reside between the autonomy system 204 and one or more vehicle controls, such as vehicle control 208. The vehicle computing system 202, and in particular, the safety monitor system 206, can communicate with the one or more vehicle controls 208 via one or more CAN interfaces. The safety monitor system 206 can monitor the outputs of the autonomy system 204, such as vehicle command data from a vehicle controller comprised within the autonomy system 204, and provide the outputs (e.g., vehicle command data, etc.) to the vehicle control(s) 208 via the CAN interface(s). By monitoring the output of the autonomy system 204, the safety monitor system 206 can detect one or more error conditions and/or failure modes of the autonomy system 204 and in particular, error conditions and/or failure modes of the vehicle controller.

For example, the safety monitor system 206 can monitor whether signals are being received from the vehicle controller and determine whether there is a potential error condition and/or failure mode that may impact autonomous vehicle operation. In some implementations, the safety monitor system 206 can determine the amount of time that has passed since a signal from the autonomy system 204 (e.g., the vehicle controller, etc.) has been updated. If the amount of time is greater than a threshold amount of time, the safety monitor system 206 can determine that an error/failure has occurred and can generate one or more signals to provide for an appropriate response. For example, in some implementations, the safety monitor system 206 can initiate one or more appropriate responses and/or maneuvers, such as generating one or more signals/commands to execute a safe stop of the vehicle, alert a driver to the failure, disengage the autonomous operation of the vehicle, and/or the like, for example.

In some implementations, the safety monitor system 206 can maintain a history of previous signals and/or command messages received from the autonomy system 204 (e.g., the vehicle controller, etc.). The safety monitor system 206 can generate a timestamp for each message as it is received. The safety monitor system 206 can determine the amount of time that has passed since the last message was received on each successive cycle (e.g., current time minus timestamp of last message). Alternatively, the safety monitor system 206 can use a timer to measure the time from the receipt of the last message. The safety monitor system 206 can determine if the amount of time that has passed has reached or exceeded a threshold amount of time, and in response, determine that an error and/or failure has occurred. Upon determining that a failure and/or error has occurred, the safety monitor system 206 can generate one or more commands and/or signals to initiate an appropriate response.

In some implementations, the safety monitor 206 can obtain vehicle data, such as vehicle motion data and/or vehicle state data for example, from the vehicle control(s) 208 via the CAN interface(s). The safety monitor system 206 can provide the vehicle data to the autonomy system 204, for example to provide for controlling operation of an autonomous vehicle.

FIG. 3 depicts a block diagram of another example vehicle controller and safety monitor system 300 according to example embodiments of the present disclosure. As illustrated in FIG. 3, a vehicle controller and safety monitor system 300 can include a computing system, such as vehicle computing system 302 and one or more vehicle controls 308. The vehicle computing system 302 can include an autonomy system 304 (for example, as described in regard to the vehicle computing system 106 of FIG. 1) and a safety monitor system 306.

The safety monitor system 306 can reside between the autonomy system 304 and the vehicle control(s) 308. The vehicle computing system 302, and in particular, the safety monitor system 306, can communicate with the vehicle control(s) 308 via one or more CAN interfaces. The safety monitor system 306 can monitor the outputs of the autonomy system 304, such as vehicle command data from a vehicle controller comprised within the autonomy system 304, and provide the outputs (e.g., vehicle command data, etc.) to the vehicle control(s) 308 via the CAN interface(s). By monitoring the output of the autonomy system 204, the safety monitor system 206 can detect one or more error conditions and/or failure modes of the autonomy system 204 and in particular, error conditions and/or failure modes of the vehicle controller.

The autonomy system 304 can also provide a readiness signal to the safety monitor system 306, such that the safety monitor system 306 can also monitor whether an autonomous vehicle is ready to engage autonomous operation. The safety monitor system 306 can determine that the vehicle controller is providing signals and/or command messages and that the vehicle is ready to engage before allowing a driver to engage the autonomous operation.

The safety monitor 306 can obtain vehicle data, such as vehicle motion data and/or vehicle state data for example, from the vehicle control(s) 3208 via the CAN interface(s). The safety monitor system 306 can provide the vehicle data to the autonomy system 304, for example to provide for controlling operation of an autonomous vehicle.

Figure 4:
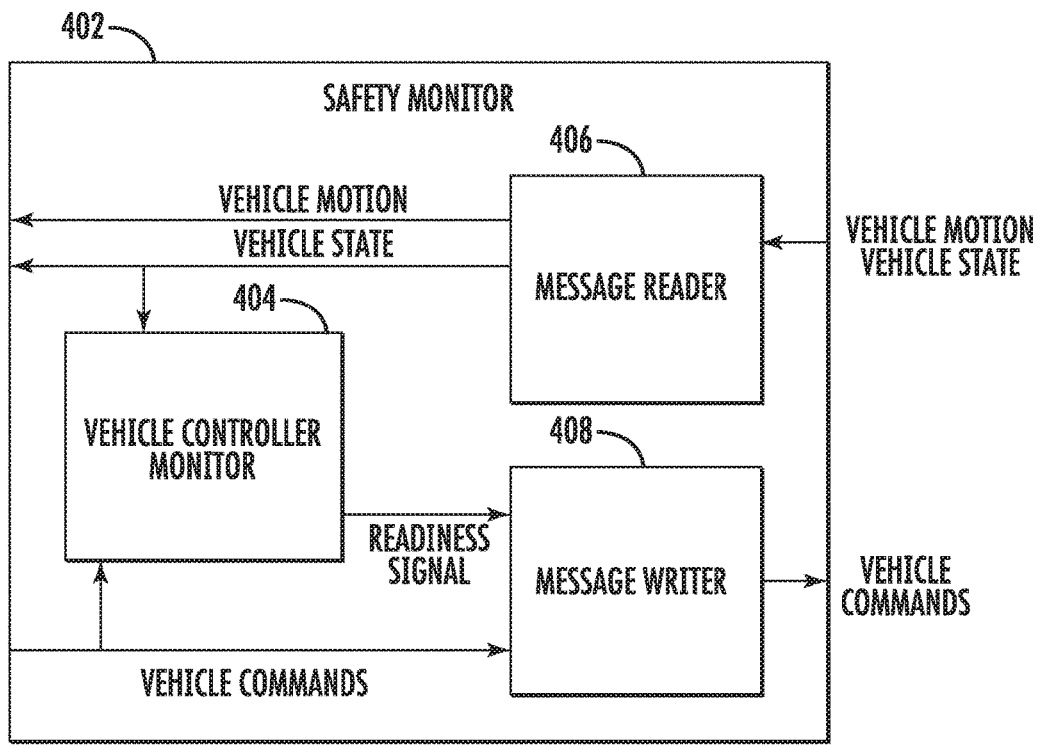
FIG. 4 depicts a block diagram of an example controller safety monitor system according to example embodiments of the present disclosure.

FIG. 4 depicts a block diagram of an example controller safety monitor system 402 according to example embodiments of the present disclosure. As illustrated in FIG. 4, a vehicle controller safety monitor system 402 can include a vehicle controller monitor 404, a message reader 406, and a message writer 408.

The safety monitor system 402 can obtain vehicle command data from an autonomy system (e.g., as described in regard to FIG. 1). The vehicle command data can be provided to the vehicle controller monitor 404 and the message writer 408. The vehicle controller monitor 404 can generate a timestamp for the vehicle command data as it is received and can maintain a history of the vehicle command data received from the autonomy system (e.g., the vehicle controller, etc.). The vehicle controller monitor 404 can determine the amount of time that has passed since the last command was received on each successive cycle (e.g., current time minus timestamp of last command). Alternatively, the vehicle controller monitor 404 can use a timer to measure the time from the receipt of the last command. The vehicle controller monitor 404 can determine if the amount of time that has passed has reached or exceeded a threshold amount of time. As long as the elapsed time has not reached or exceeded a threshold amount of time, the vehicle controller monitor 404 can provide a readiness signal to the message writer 408. Upon receiving readiness signal, the message writer 408 can provide the vehicle command data to one or more vehicle controls, for example via one or more CAN interfaces. If the amount of time that has elapsed has reached or exceeded a threshold amount of time, the vehicle controller monitor 404 can determine that an error and/or failure has occurred and can generate one or more commands and/or signals to initiate an appropriate response.

The message reader 406 can obtain vehicle data, such as vehicle motion data and/or vehicle state data, from one or more vehicle controls, for example via one or more CAN interfaces. The message reader 406 can provide the vehicle motion and vehicle state data to the autonomy system, for example, to provide for controlling operation of an autonomous vehicle. The message reader can also provide the vehicle state data to the vehicle controller monitor 404.

Figure 5:
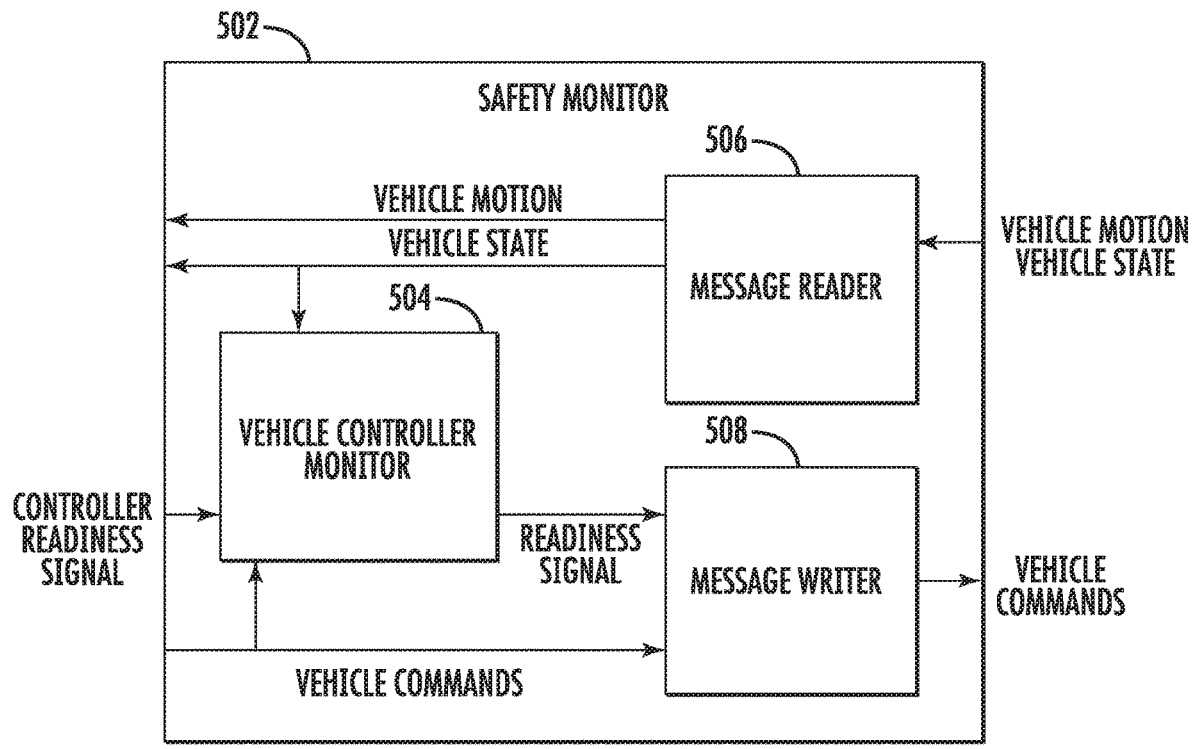
FIG. 5 depicts a block diagram of an example controller safety monitor system according to example embodiments of the present disclosure.

FIG. 5 depicts a block diagram of an example controller safety monitor system 502 according to example embodiments of the present disclosure. As illustrated in FIG. 5, a vehicle controller safety monitor system 502 can include a vehicle controller monitor 504, a message reader 506, and a message writer 508.

The safety monitor system 502 can obtain vehicle command data from an autonomy system (e.g., as described in regard to FIG. 1). The vehicle command data can be provided to the vehicle controller monitor 504 and the message writer 508. The vehicle controller monitor 504 can also obtain a controller readiness signal from the autonomy system (e.g., a vehicle controller, etc.) for use in determining whether autonomous operation can be engaged or maintained.

The vehicle controller monitor 504 can generate a timestamp for the vehicle command data as it is received and can maintain a history of the vehicle command data received from the autonomy system (e.g., the vehicle controller, etc.). The vehicle controller monitor 504 can determine the amount of time that has passed since the last command was received on each successive cycle (e.g., current time minus timestamp of last command). Alternatively, the vehicle controller monitor 504 can use a timer to measure the time from the receipt of the last command. The vehicle controller monitor 504 can determine if the amount of time that has passed has reached or exceeded a threshold amount of time. As long as the elapsed time has not reached or exceeded a threshold amount of time and the vehicle controller monitor has received a controller readiness signal, the vehicle controller monitor 504 can provide a readiness signal to the message writer 508. Upon receiving the readiness signal, the message writer 508 can provide the vehicle command data to one or more vehicle controls, for example via one or more CAN interfaces. If the amount of time that has elapsed has reached or exceeded a threshold amount of time and/or the controller readiness signal has not been received, the vehicle controller monitor 504 can determine that an error and/or failure has occurred and can generate one or more commands and/or signals to initiate an appropriate response.

The message reader 506 can obtain vehicle data, such as vehicle motion data and/or vehicle state data, from one or more vehicle controls, for example via one or more CAN interfaces. The message reader 506 can provide the vehicle motion and vehicle state data to the autonomy system, for example, to provide for controlling operation of an autonomous vehicle. The message reader can also provide the vehicle state data to the vehicle controller monitor 504.

Figure 6:
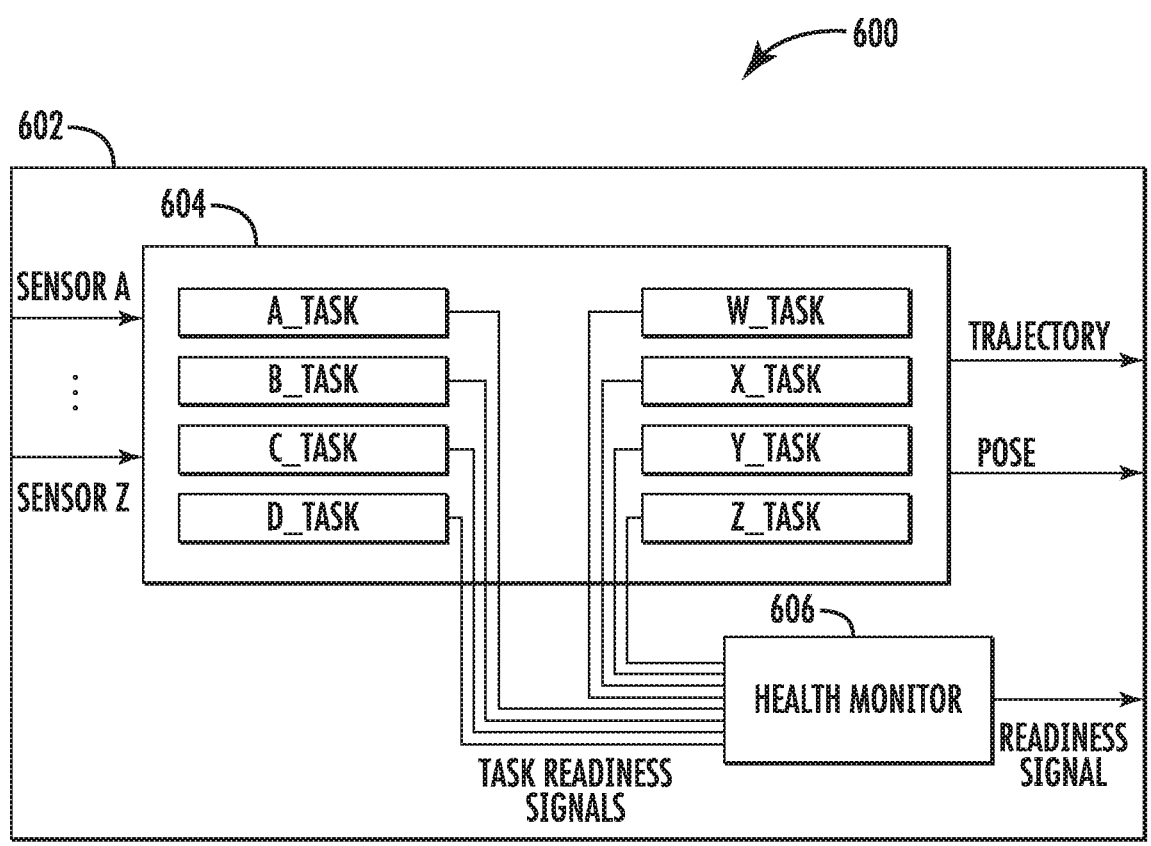
FIG. 6 depicts a block diagram of an example task health monitor system according to example embodiments of the present disclosure.

FIG. 6 depicts a block diagram of an example autonomy system comprising a task health monitor system 600 according to example embodiments of the present disclosure. As illustrated in FIG. 6, a computing system 602 can include an autonomy system 604 and a health monitor 606. In some implementations, one or more autonomy subsystems included in autonomy system 604 can be monitored in addition to the vehicle controller. The safety monitor system can provide different responses to the error conditions/failure modes depending on the subsystem affected.

As described in regard to FIG. 1, the autonomy system 604 can receive sensor data and/or other data (e.g. map data, positioning system data, vehicle motion data, vehicle state data, and/or the like) and determine commands to provide for autonomous operation of a vehicle. The autonomy system 604 can generate vehicle trajectory and pose data to provide for determining vehicle command data. The vehicle command data can be provided to a safety monitor system (e.g., as described in regard to FIG. 5) which can provide the vehicle command data to one or more vehicle controls.

One or more subsystems included in the autonomy system 604 can provide readiness signals to the health monitor 606 indicating that the subsystem(s) are functioning properly and that autonomous operation may be engaged and/or maintained (e.g., the subsystem(s) are not in an error/failure state). Upon receiving readiness signals form the subsystem(s), the health monitor 606 can provide a readiness signal to the safety monitor system, for example, as described in regard to FIG. 5.

Figure 7A:
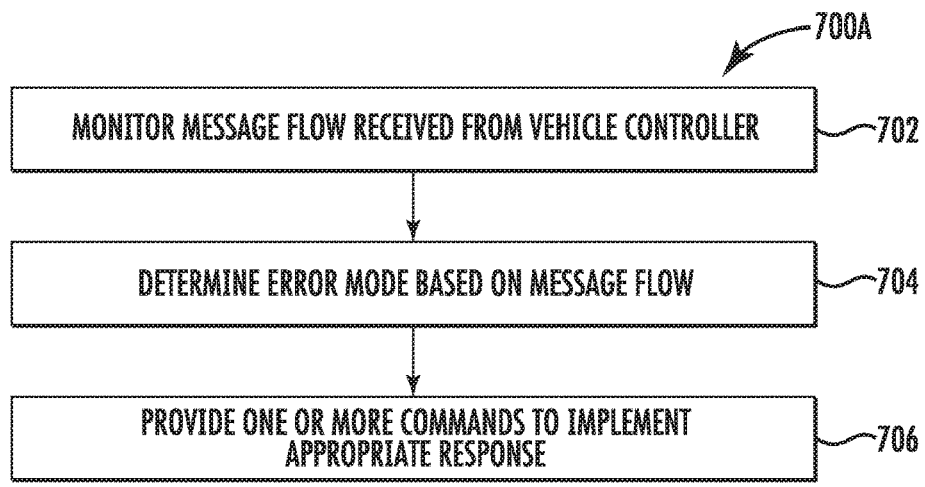
FIGS. 7A-7B depict flowchart diagrams of example operations for monitoring an autonomous vehicle controller according to example embodiments of the present disclosure.

FIG. 7A depicts a flowchart diagram of example operations 700A for monitoring an autonomous vehicle controller according to example embodiments of the present disclosure. One or more portion(s) of the operations 700A can be implemented by one or more computing devices such as, for example, the vehicle computing system 106 of FIG. 1, the computing system 902 or 106 of FIG. 9, or the like. Moreover, one or more portion(s) of the operations 700A can be implemented as an algorithm on the hardware components of the device(s) described herein (e.g., as in FIGS. 1 and 9) to, for example, provide for monitoring a vehicle controller during autonomous vehicle operation.

At 702, one or more computing devices included within a computing system (e.g., computing system 106, 902, or the like) can obtain vehicle command data (e.g., command messages) from a vehicle controller (e.g., vehicle controller 116 of FIG. 1, for example). The command data can be monitored to determine whether signals are being received from the vehicle controller and subsequently determine whether there is a potential error condition and/or failure mode that may impact autonomous vehicle operation.

At 704, the computing system can determine whether an error mode exists in regard to the vehicle controller has error mode based on the command message flow. For example, the computing system can determine the amount of time that has passed since a message has been received from the vehicle controller. If the amount of time is greater than a threshold amount of time, the computing can determine that an error/failure has occurred in the vehicle controller.

At 706, upon determining that an error/failure has occurred in the vehicle controller, the computing system can provide one or more commands to implement an appropriate response to the error. For example, the computing system can initiate one or more appropriate responses and/or maneuvers, such as generating one or more signals/commands to execute a safe stop of the vehicle, alert a driver to the failure, disengage the autonomous operation of the vehicle, and/or the like, for example.

Figure 7B:
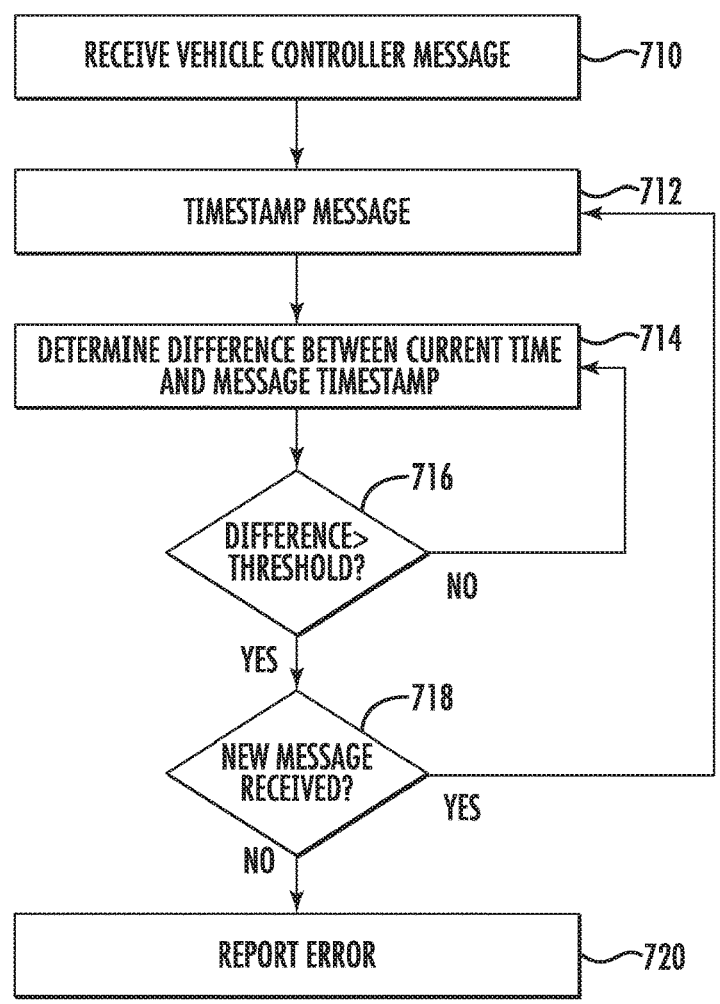

FIG. 7B depicts a flowchart diagram of example operations 700B for monitoring an autonomous vehicle controller according to example embodiments of the present disclosure. In particular, operations 700B provide example operations in regard to determining an error mode as described in regard to operation 704 of FIG. 7A. One or more portion(s) of the operations 700B can be implemented by one or more computing devices such as, for example, the vehicle computing system 106 of FIG. 1, the computing system 902 or 106 of FIG. 9, or the like. Moreover, one or more portion(s) of the operations 700B can be implemented as an algorithm on the hardware components of the device(s) described herein (e.g., as in FIGS. 1 and 9) to, for example, provide for monitoring a vehicle controller during autonomous vehicle operation.

At 710, one or more computing devices included within a computing system (e.g., computing system 106, 902, or the like) can receive a message (e.g., vehicle command data) from a vehicle controller.

At 712, the computing system can generate a timestamp for the received message and store the received message along with the timestamp in a command history.

At 714, the computing system can determine a difference amount between the current time and the last message timestamp at each successive cycle.

At 716, the computing system can determine if the difference amount has reached or exceeded a threshold amount of time at each successive cycle. If the difference amount has reached or exceeded a threshold amount of time, the operation continues to 718. If the difference amount has not reached or exceeded a threshold amount of time, operation returns to 714 for a difference amount to be determined in the next cycle.

At 718, the computing system can determine if a new message has been received from the vehicle controller. If a new message has been received, operation returns to 712, and the new message can be timestamped and stored to the command history. If a new message has not been received from the vehicle controller, operation continues to 720.

At 720, the computing system can determine that an error has occurred in regard to the vehicle controller and can report the error for use in determining an appropriate response, as described in regard to operation 706 of FIG. 7A.

Figure 8:
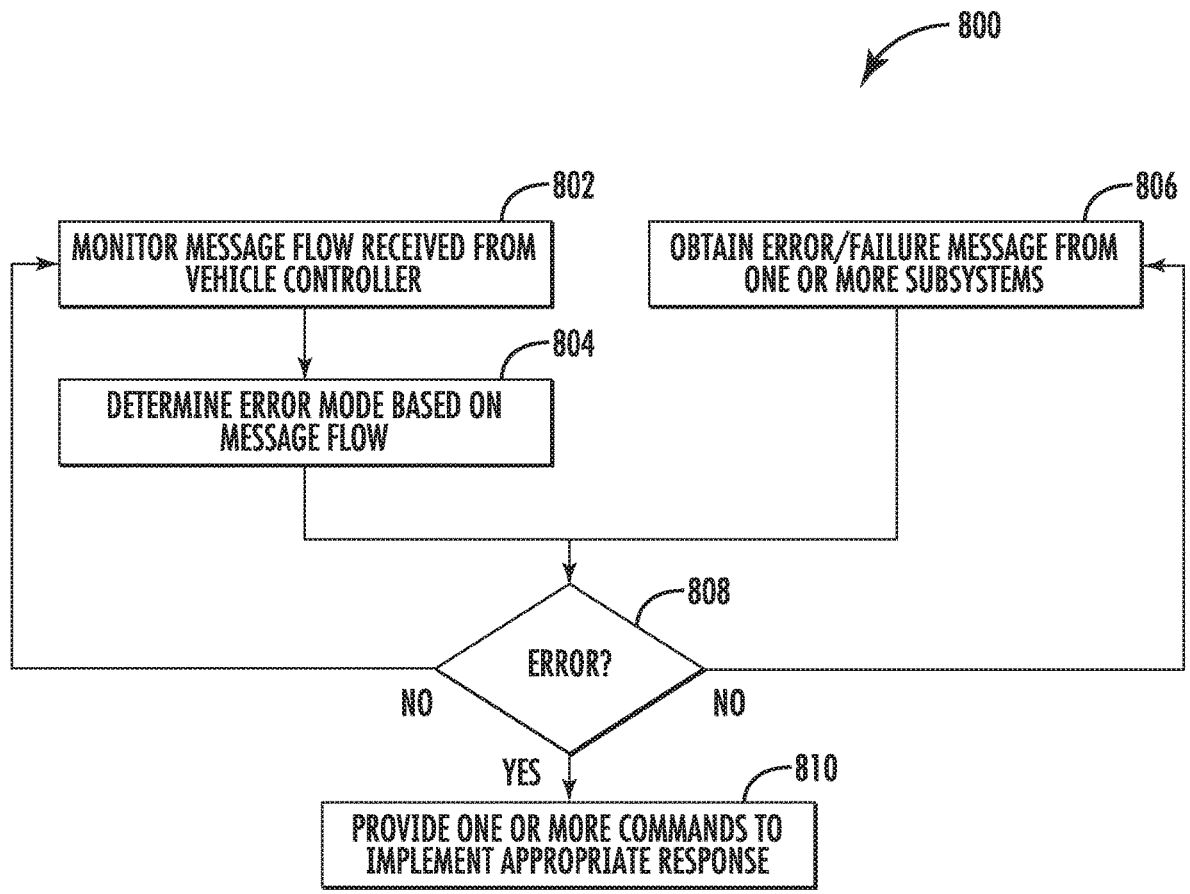
FIG. 8 depicts a flowchart diagram of example operations for monitoring an autonomous vehicle controller or other autonomy subsystem according to example embodiments of the present disclosure.

FIG. 8 depicts a flowchart diagram of example operations 800 for monitoring an autonomous vehicle controller and/or other autonomy subsystem(s) according to example embodiments of the present disclosure. One or more portion(s) of the operations 800 can be implemented by one or more computing devices such as, for example, the vehicle computing system 106 of FIG. 1, the computing system 902 or 106 of FIG. 9, or the like. Moreover, one or more portion(s) of the operations 800 can be implemented as an algorithm on the hardware components of the device(s) described herein (e.g., as in FIGS. 1 and 9) to, for example, provide for monitoring a vehicle controller or other autonomy subsystem during autonomous vehicle operation.

At 802, one or more computing devices included within a computing system (e.g., computing system 106, 902, or the like) can obtain vehicle command data (e.g., command messages) from a vehicle controller (e.g., vehicle controller 116 of FIG. 1, for example). The command data can be monitored to determine whether signals are being received from the vehicle controller and subsequently determine whether there is a potential error condition and/or failure mode that may impact autonomous vehicle operation.

At 804, the computing system can determine whether an error mode exists in regard to the vehicle controller has error mode based on the command message flow. For example, the computing system can determine the amount of time that has passed since a message has been received from the vehicle controller. If the amount of time is greater than a threshold amount of time, the computing can determine that an error/failure has occurred in the vehicle controller.

At 806, the computing system can additionally obtain an error/failure status from one or more other autonomy subsystems. For example, in some implementations, one or more autonomy subsystems can be monitored in addition to the vehicle controller. The computing system can provide different responses to the error modes/failure states depending on the subsystem affected. For example, each of the subsystems, such as sensors, perception, prediction, motion planning, and/or the like can have their own error modes/failure states. In some implementations, each subsystem can have its own monitoring metrics which can be understood by the computing system. Each subsystem can monitor for its own failure modes (e.g., edge cases) and report its failure mode to the computing system in a common format.

At 808, the computing system can determine if the vehicle controller is in an error/failure state (from operation 804) and/or if one or more subsystems is in an error/failure state (from operation 806). If the vehicle controller and/or one or more other subsystems are in an error/failure state, operation continues to 810. If the vehicle controller and other subsystem(s) are not in an error/failure state operation returns to 802/806 to continuing monitoring the vehicle controller and/or other subsystem(s).

At 810, upon determining that an error/failure state has occurred, the computing system can provide one or more commands to implement an appropriate response to the error. For example, the computing system can initiate one or more appropriate responses and/or maneuvers, such as generating one or more signals/commands to execute a safe stop of the vehicle, alert a driver to the failure, disengage the autonomous operation of the vehicle, and/or the like, for example.

Although FIGS. 7A, 7B, and 8 depict steps performed in a particular order for purposes of illustration and discussion, the methods of the present disclosure are not limited to the particularly illustrated order or arrangement. The various steps of the methods 700A, 700B, and 800 can be omitted, rearranged, combined, and/or adapted in various ways without deviating from the scope of the present disclosure.

Figure 9:
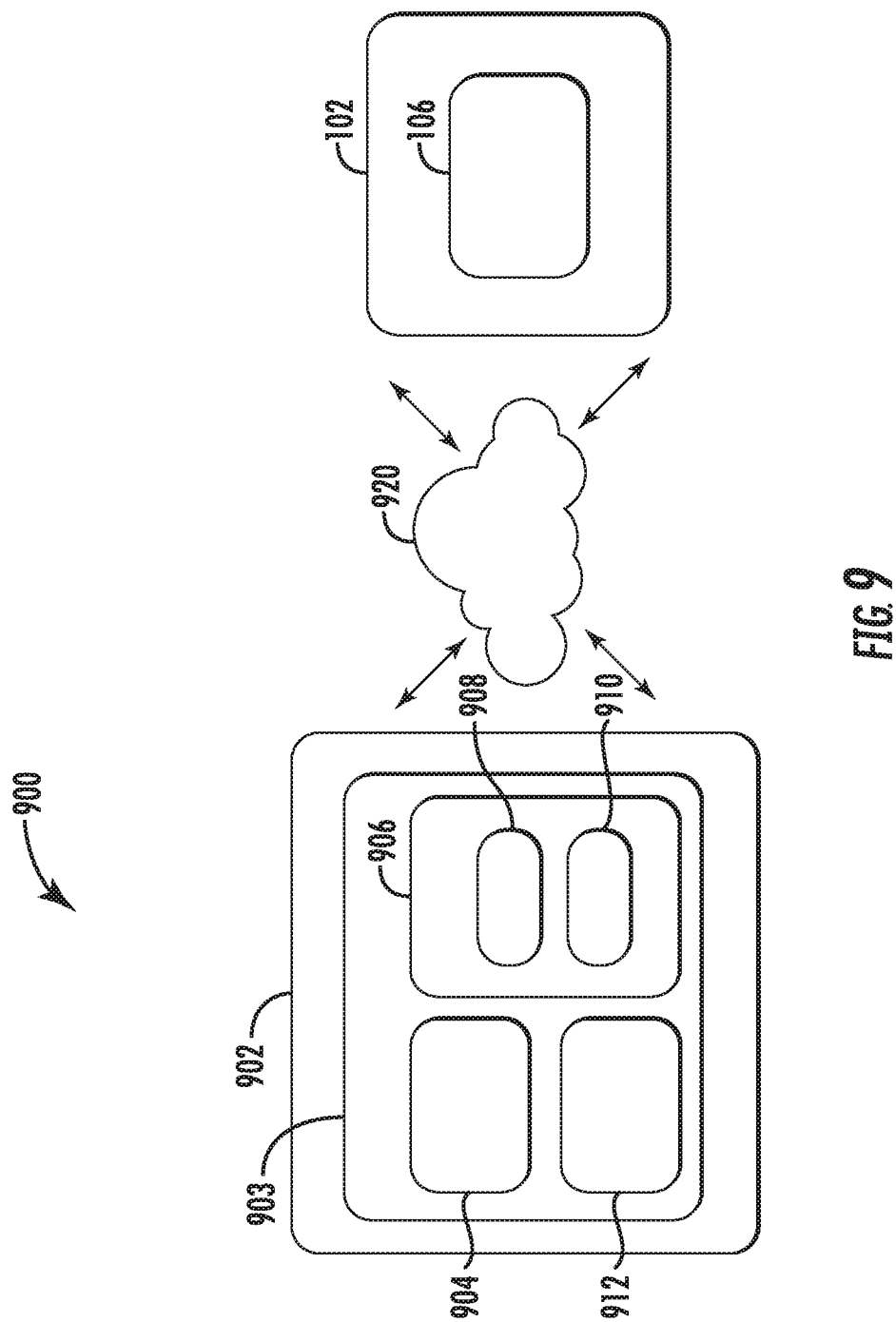
FIG. 9 depicts a block diagram of an example computing system according to example embodiments of the present disclosure.

FIG. 9 depicts a block diagram of an example computing system 900 according to example embodiments of the present disclosure. The example computing system 900 illustrated in FIG. 9 is provided as an example only. The components, systems, connections, and/or other aspects illustrated in FIG. 9 are optional and are provided as examples of what is possible, but not required, to implement the present disclosure. In some implementations, the example computing system 900 can include the vehicle computing system 106 of the autonomous vehicle 102 and a computing system 902 (e.g., an operations computing system), including one or more computing device(s) 903, that is remote from the autonomous vehicle 102. The vehicle computing system 106 of the autonomous vehicle 102 and the computing system 902 can be communicatively coupled to one another over one or more networks 920. The computing system 902 can, for example, be associated with a central operations system and/or an entity associated with the autonomous vehicle 102 such as, for example, a vehicle owner, vehicle manager, fleet operator, service provider, etc.

The computing device(s) 903 of the computing system 902 can include processor(s) 904 and a least one memory 906. The one or more processors 904 can be any suitable processing device (e.g., a processor core, a microprocessor, an ASIC, a FPGA, a controller, a microcontroller, etc.) and can be one processor or a plurality of processors that are operatively connected. The memory 906 can include one or more non-transitory computer-readable storage media, such as RAM, ROM, EEPROM, EPROM, one or more memory devices, flash memory devices, etc., and combinations thereof.

The memory 906 can store information that can be accessed by the one or more processors 904. For instance, the memory 906 (e.g., one or more non-transitory computer-readable storage mediums, memory devices) can include computer-readable instructions 908 can be executed by the one or more processors 904. The instructions 908 can be software written in any suitable programming language or can be implemented in hardware. Additionally, or alternatively, the instructions 908 can be executed in logically and/or virtually separate threads on processor(s) 904.

For example, the memory 906 can store instructions 908 that when executed by the one or more processors 904 cause the one or more processors 904 to perform operations such as any of the operations and functions of the computing device(s) 903 or for which the computing device(s) 903 are configured, as described herein including, for example, operations of FIGS. 7A, 7B, and/or 8.

The memory 906 can store data 910 that can be obtained, received, accessed, written, manipulated, created, and/or stored. The data 910 can include, for instance, sensor data, map data, service request data (e.g., trip and/or user data), operational data, etc., as described herein. In some implementations, the computing device(s) 903 can obtain data from one or more memory device(s) that are remote from the computing system 902.

The computing device(s) 903 can also include one or more communication interfaces 912 used to communicate with one or more other system(s) associated with the computing system 902 and/or another computing device that is remote from the computing system 902, such as the vehicle computing system 106 of the autonomous vehicle 102, for example. The communication interface 912 can include any circuits, components, software, etc. for communicating with one or more networks (e.g., 920). In some implementations, the communication interface 912 can include for example, one or more of a communications controller, receiver, transceiver, transmitter, port, conductors, software, and/or hardware for communicating data.

The network(s) 920 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 920 can be accomplished, for instance, via a communication interface using any type of protocol, protection scheme, encoding, format, packaging, etc.

The vehicle computing system 106 of the autonomous vehicle can include one or more computing devices, such as described in regard to FIG. 1. The remote computing devices can include components (e.g., processor(s), memory, instructions, data, etc.) similar to that described herein for the computing device(s) 903, and as described in regard to FIG. 1. Moreover, the vehicle computing system 106 can be configured to perform one or more operations, as described herein including, for example, operations of FIGS. 7A, 7B, and/or 8.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A system comprising:
   one or more processors; and
   memory storing instructions that, when executed by the one or more processors, cause the one or more processors to perform operations, the operations comprising:
   obtaining a message from a vehicle controller;
   based at least partly on the message, determining whether a failure mode exists, wherein determining whether the failure mode exists comprises:
   generating a timestamp for the message from the vehicle controller;
   determining a time difference between a current time and the timestamp; and
   determining the failure mode exists when the time difference exceeds an error threshold and another message has not been received from the vehicle controller; and
   providing, in response to determining the failure mode exists, one or more commands to implement a safety measure response for an autonomous vehicle.

2. The system of claim 1, wherein determining whether the failure mode exists further comprises receiving a not-ready signal from the autonomous vehicle.

3. The system of claim 1, wherein determining whether the failure mode exists further comprises receiving an error mode signal from one or more autonomous vehicle subsystems.

4. The system of claim 1, wherein determining whether the failure mode exists comprises:
  initializing a timer upon receipt of the message from the vehicle controller; and
  determining the failure mode exists based at least in part on the timer.

5. The system of claim 1, wherein the safety measure response comprises providing commands to one or more vehicle control interfaces to implement a safe stop.

6. The system of claim 1, wherein the safety measure response comprises providing one or more alerts regarding the failure mode to a driver and disengaging autonomous operation of the autonomous vehicle.

7. The system of claim 1, wherein the one or more processors is separate from one or more processors associated with the vehicle controller.

8. A computer-implemented method for providing a safety monitor comprising:
  obtaining, by a computing system comprising one or more computing devices, a message from a vehicle controller;
  determining, by the computing system, whether a failure mode exists, wherein determining whether the failure mode exists comprises:
    generating a timestamp for the message from the vehicle controller;
    determining a time difference between a current time and the timestamp; and
    determining the failure mode exists when the time difference exceeds an error threshold and another message has not been received from the vehicle controller; and
  providing, by the computing system in response to determining the failure mode exists, one or more commands to implement a safety measure response for an autonomous vehicle.

9. The computer-implemented method of claim 8, wherein determining whether the failure mode exists further comprises receiving, by the computing system, a not-ready signal from the autonomous vehicle.

10. The computer-implemented method of claim 8, wherein determining whether the failure mode exists further comprises receiving, by the computing system, an error mode signal from one or more autonomous vehicle subsystems.

11. The computer-implemented method of claim 8, wherein determining whether the failure mode exists comprises:
  initializing, by the computing system, a timer upon receipt of the message from the vehicle controller; and
  determining, by the computing system, the failure mode exists based at least in part on the timer.

12. The computer-implemented method of claim 8, wherein the safety measure response comprises providing, by the computing system, commands to one or more vehicle control interfaces to implement a safe stop.

13. The computer-implemented method of claim 8, wherein the safety measure response comprises providing, by the computing system, one or more alerts regarding the failure mode to a driver and disengaging autonomous operation of the autonomous vehicle.

14. The computer-implemented method of claim 8, wherein the safety monitor is executing on one or more separate processors from the vehicle controller.

15. An autonomous vehicle comprising:
  a vehicle computing system, the vehicle computing system comprising:
    one or more processors; and
    memory storing instructions that, when executed by the one or more processors, cause the one or more processors to perform operations, the operations comprising:
      obtaining a message from a vehicle controller;
      determining whether a failure mode exists, wherein determining whether the failure mode exists comprises:
        generating a timestamp for the message from the vehicle controller;
        determining a time difference between a current time and the timestamp; and
        determining the failure mode exists when the time difference exceeds an error threshold and another message has not been received from the vehicle controller; and
      providing, in response to determining the failure mode exists, one or more commands to implement a safety measure response for the autonomous vehicle.

16. The autonomous vehicle of claim 15, wherein determining whether the failure mode exists further comprises one or more of:
  receiving a not-ready signal from the autonomous vehicle; and
  receiving an error mode signal from one or more autonomous vehicle subsystems.

17. The autonomous vehicle of claim 15, wherein determining whether the failure mode exists comprises:
  initializing a timer upon receipt of the message from the vehicle controller; and
  determining a failure mode exists based at least in part on the timer.

* * * * *